United States Patent [19]

Eng

[11] Patent Number: 5,895,982
[45] Date of Patent: Apr. 20, 1999

[54] FULLY REGULATED POWER BUS USING MULTIPLE SOURCE BUS REGULATORS

[75] Inventor: John E. Eng, Buena Park, Calif.

[73] Assignee: Hughes Electronics Corporation, Los Angeles, Calif.

[21] Appl. No.: 08/641,965

[22] Filed: May 2, 1996

[51] Int. Cl.$^6$ .................................................. H02J 1/00
[52] U.S. Cl. .......................... 307/87; 307/64; 307/43; 323/906
[58] Field of Search .......................... 307/43, 64, 65, 307/66, 85, 86, 87; 323/906, 282

[56] References Cited

U.S. PATENT DOCUMENTS

| | | | |
|---|---|---|---|
| 5,025,202 | 6/1991 | Ishii et al. | 320/101 |
| 5,144,222 | 9/1992 | Herbert | 323/271 |
| 5,233,287 | 8/1993 | Lenk | 323/268 |
| 5,359,280 | 10/1994 | Canter et al. | 323/282 |
| 5,594,325 | 1/1997 | Manner | 323/282 |
| 5,604,430 | 2/1997 | Decker et al. | 323/275 |
| 5,623,398 | 4/1997 | Beach et al. | 363/65 |

*Primary Examiner*—Jeffrey Gaffin
*Assistant Examiner*—Jonathan S. Kaplan
*Attorney, Agent, or Firm*—Georgann S. Grunebach; M. W. Sales

[57] ABSTRACT

A fully regulated multiple source power bus subsystem for a satellite having at least a solar panel array and a battery providing unregulated sources of electrical power. The battery and solar panel array are connected to one or more multiple source bus regulators to produce a fully regulated bus output at one or more preselected voltages. Each multiple source bus regulator automatically switches between the battery and solar panel array and may produce either a positive or a negative bus voltage. A battery charge controller controls the charging of the battery when the output voltage of the solar panel array is greater than the output voltage of the battery.

10 Claims, 2 Drawing Sheets

1

FULLY REGULATED POWER BUS USING MULTIPLE SOURCE BUS REGULATORS

TECHNICAL FIELD

The invention is related to power bus systems and subsystems and, in particular, to a power bus subsystem using multiple source bus regulators.

BACKGROUND ART

Prior fully regulated bus-type satellite power subsystems were composed of a separate bus regulator for the electrical power produced by solar panel arrays and a separate bus regulator for the battery. These types of subsystems required double processing of the battery to produce multiple bus voltages. In particular, existing power bus subsystems required processing power through two (2) units to provide an auxiliary power bus at a voltage different than the primary bus voltage.

DISCLOSURE OF THE INVENTION

The object of the invention is to provide a fully regulated bus power subsystem having multiple sources of electrical power and using one or more multiple source bus regulators.

Another object of the invention is a fully regulated bus type satellite power subsystem having at least two sources of electrical power.

Another object of the invention is a multiple source bus regulator for use in multiple source regulated bus power subsystems.

Still another object of the invention is a multiple source bus regulator capable of producing positive or negative regulated bus voltages.

The fully regulated power bus subsystem according to the invention has a first unregulated source of electrical power and a second source of electrical power. The subsystem further has at least one multiple source bus regulator connected to the first and second unregulated sources of electrical power to produce a fully regulated bus output at a preselected voltage. The multiple source bus regulator automatically switching between the relatively greater of the first and the second unregulated sources as determined by the circuit turn ratios to produce the regulated bus output voltage.

In the preferred embodiment, the subsystem is for a satellite bus system powered by a solar panel array and a battery and includes a battery charge control for charging the battery when the voltage output of the solar panel array is relatively greater than the voltage output of the battery.

These and other advantages of the fully regulated multiple source power bus system will become more apparent from a reading of the specification in conjunction with the drawings.

BEST MODE FOR CARRYING OUT THE INVENTION

Figure 1:
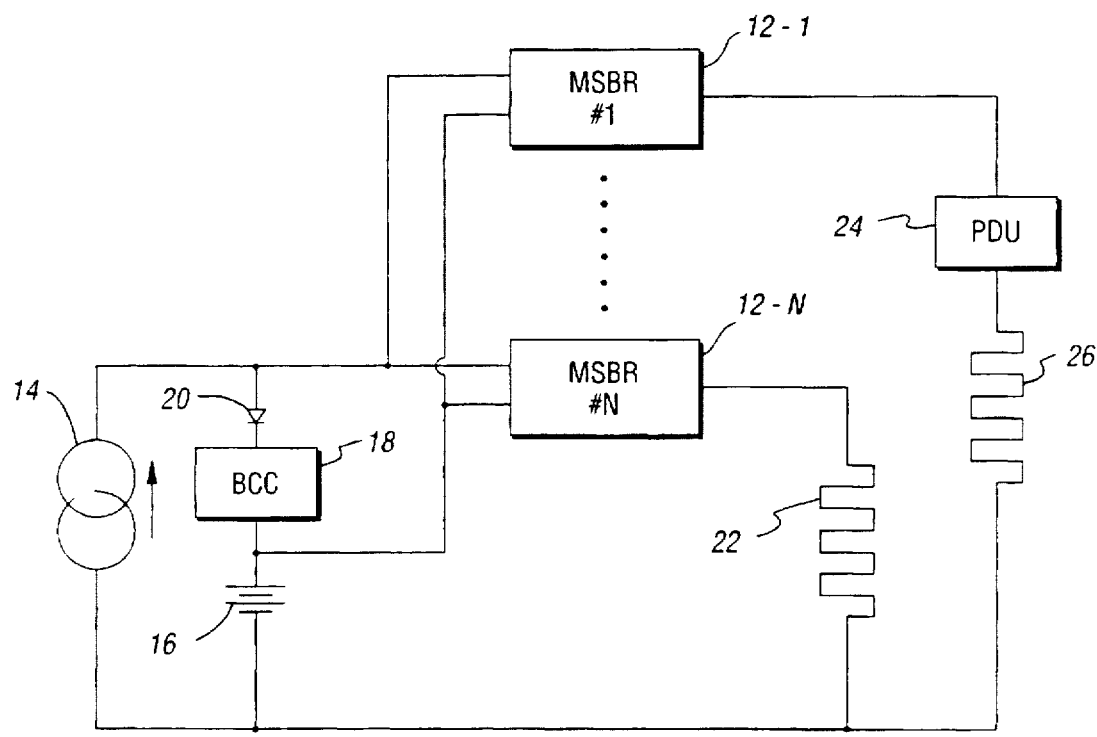
FIG. 1 is a block diagram of the fully regulated multiple source power bus regulator subsystem.

The invention is a fully regulated bus-type satellite power subsystem 10 that utilizes one or more Multiple Source Bus Regulators (MSBRs) 12-1 through 12-N as shown in FIG. 1. The subsystem 10 has two sources of electrical power such as a solar panel array 14 and a battery 16. Although the subsystem shown in FIG. 1 has only two sources of electrical power, a satellite may have three or more sources of electrical power as is known in the art. The Multiple Source Bus Regulators 12-1 through 12-N have the ability to provide different regulated bus voltages at one or more places on a satellite without requiring double processing of primary power from the solar panel array 14 or the battery resulting in higher overall efficiency.

In the preferred embodiment, the solar panel array 14 is capable of producing an output voltage in the range from 110 to 150 V and the battery 16, at full charge provides a 100 V output. To maintain the charge on the battery 16, a Battery Charge Controller (BCC) 18 is connected between the solar panel array 14 and the battery 16 and a diode 20 is connected between the solar panel array 14 and the Battery Charge Controller 18. The Battery Charge Controller 18 controls the rate and the voltage at which the battery 16 is charged when the voltage output of the solar panel array 14 is greater than the output voltage of the battery and is operative to charge the battery to a fully charged state. The diode 20 inhibits the discharge of the battery 16 when the output voltage of the solar panel array 14 is less than the output voltage of the battery 16 such as when the solar panel array is in the shadow of the earth.

The output electrical power of the solar panel array 14 and the output electrical power of the battery 16 are communicated to each of the Multiple Source Bus Regulators 12-1 through 12-N. The Multiple Source Bus Regulators 12-1 through 12-N draw electrical power from the relatively higher voltage source and provides a preselected regulated bus voltage. Each of the Multiple Source Bus Regulators 12-1 through 12-N may output a different regulated voltage as may be required for different applications.

The outputs of the Multiple Source Bus Regulators 12 may be connected directly to various spacecraft loads, various payloads and spacecraft units, collectively indicated by resistance 22. If fusing or other power distributions are required, a Power Distribution Unit (PDU) 24 is disposed between the Multiple Source Bus Regulators 12-1 through 12-N and the loads, collectively indicated by resistance 26. The Power Distribution Units 24 are used to isolate the Multiple Source Bus Regulators from shorts or other malfunctions within individual loads.

Figure 2:
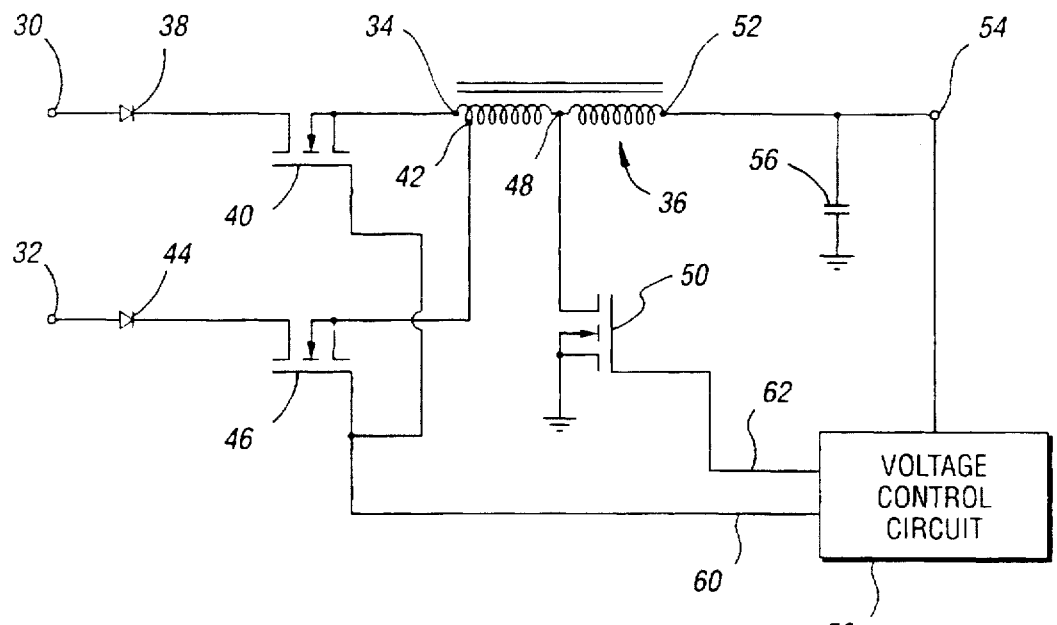
FIG. 2 is a circuit diagram of a first embodiment of a multiple source bus regulator.

FIG. 2 illustrates a first embodiment of a Multiple Source Bus Regulator 12 having a first input terminal 30 and a second input terminal 32, each connectable to a different source of electrical power. The first input terminal 30 is connected to an input end 34 of a non-isolated tapped buck transformer 36 through a first isolation diode 38 and a first electronic switch indicated by field effect transistor 40. The second input terminal 32 is connected to a first tap 42 of the tapped buck transformer 36 through a second isolation diode 44 and a second electronic switch indicated by field effect transistor 46.

A second or center tap 48 of the tapped buck transformer 36 is connected to ground through a third switch indicated by field effect transistor 50. The output end 52 of the tapped buck transformer 36 is connected to the bus output terminal 54 and to one electrode of a filter capacitor 56. The second electrode of the filter capacitor 56 is connected to ground. In the embodiment shown in FIG. 2, the bus voltage produced at bus output terminal 54 is a positive voltage, however, one skilled in the art would recognize if the voltages received at the first and second input terminals are negative voltages and the polarity of isolation diodes and field effect transistors are reversed, the regulated output bus voltage may be a corresponding negative bus voltage.

The output end 52 of the tapped buck transformer 36 is also connected to the input of a voltage control circuit 58 which generates a pair of complementary square wave train signals on lines 60 and 62. Line 60 is connected to the gates of field effect transistors 40 and 46 and line 62 is connected to the gate of field effect transistor 50. The complementary wave train signals gate the voltages appearing at the input terminals 30 and 32 to the input end 34 and tap 42 of the transformer 36, respectively, and connect the center tap 48 of the transformer 36 to ground in an alternating sequence. The voltage generated at the bus output terminal 54 controls the duty cycles of the complementary wave train signals generated by the voltage control circuit 58 to maintain the voltage at the bus output terminal 54 at a preselected value. For example, when the voltage output of the solar panel array 14 is in the range from 110 to 140 volts and the output voltage of the fully charged battery 16 is approximately 100 volts, the voltage control circuit 52 may control the duty cycles of the complementary wave train signals to produce a regulated output voltage at the bus output terminal 54 of 50 volts or any other selected voltage independent of the load connected to the bus output terminal.

Preferably, the complementary wave train signals are square wave signals having a frequency in the range from 20 KHz to 200 KHz. However, it is recognized that the frequency of the wave train signals may be greater or less than the preferred frequency range. The turns ratio of the tapped buck transformer 36 between the input end 34 and the first tap 42, between the first tap 42 and the center tap 48, and between the center tap 48 and the output end 52 are 1:4:5, respectively, for the implementation shown in FIG. 1.

Figure 3:
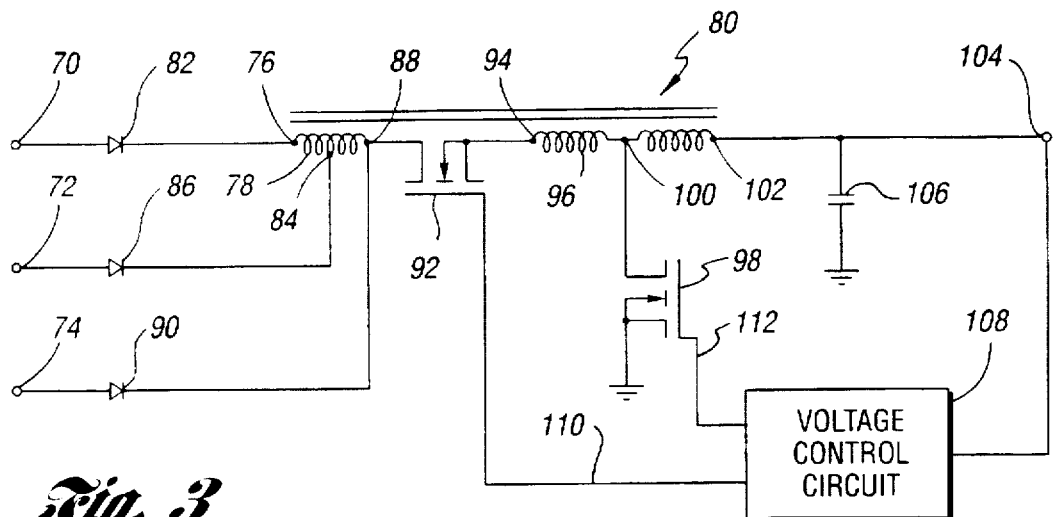
FIG. 3 is a circuit diagram of a second embodiment of a multiple source bus regulator.

A second embodiment of the Multiple Source Bus Regulator 12 is illustrated in FIG. 3. The second embodiment of the Multiple Source Bus Regulator has a first input terminal 70, a second input terminal 72 and a third input terminal 74. The first input terminal 70 is connected to the input end 76 of an isolated segment 78 of a tapped buck transformer 80 through a first isolation diode 82. The second input terminal 72 is connected to an intermediate tap 84 of the isolated segment 78 through a second isolation diode 86 and the third input terminal 74 is connected to the opposite end 88 of the isolated segment 78 through a third isolation diode 90.

A first switch, illustrated by field effect transistor 92 connects the opposite end 88 of the isolated section 78 to a tap 94 on a remaining segment 96 of the tapped buck transformer 80. A second switch 98 has one end connected to a tap 100 of segment 96 and an opposite end connected to a common ground. The output end 102 of winding 96 is connected to the bus output terminal 104 and to one electrode of a filter capacitor 106. The other electrode of the filter capacitor 106 is connected to the common ground.

The second embodiment also has a voltage control circuit 108 having its input connected to the output terminal 104. The voltage control circuit 108 is operative to generate complementary wave train signals on lines 110 and 112 connected to the gate of field effect transistor 92 and to the gate of field effect transistor 98, respectively. The voltage control circuit 108 is responsive to the voltage at the bus output terminal 104 to control the duty cycles of the complementary wave train signals on lines 110 and 112 so as to regulate and maintain the voltage at the bus output terminal 104 at a preselected value intermediate the smallest input voltage and ground.

As with the first embodiment, the frequency of the wave train signals is preferably between 20 KHz and 200 KHz and the turns ratios between the various segment are selected to produce the desired output voltage.

Figure 4:
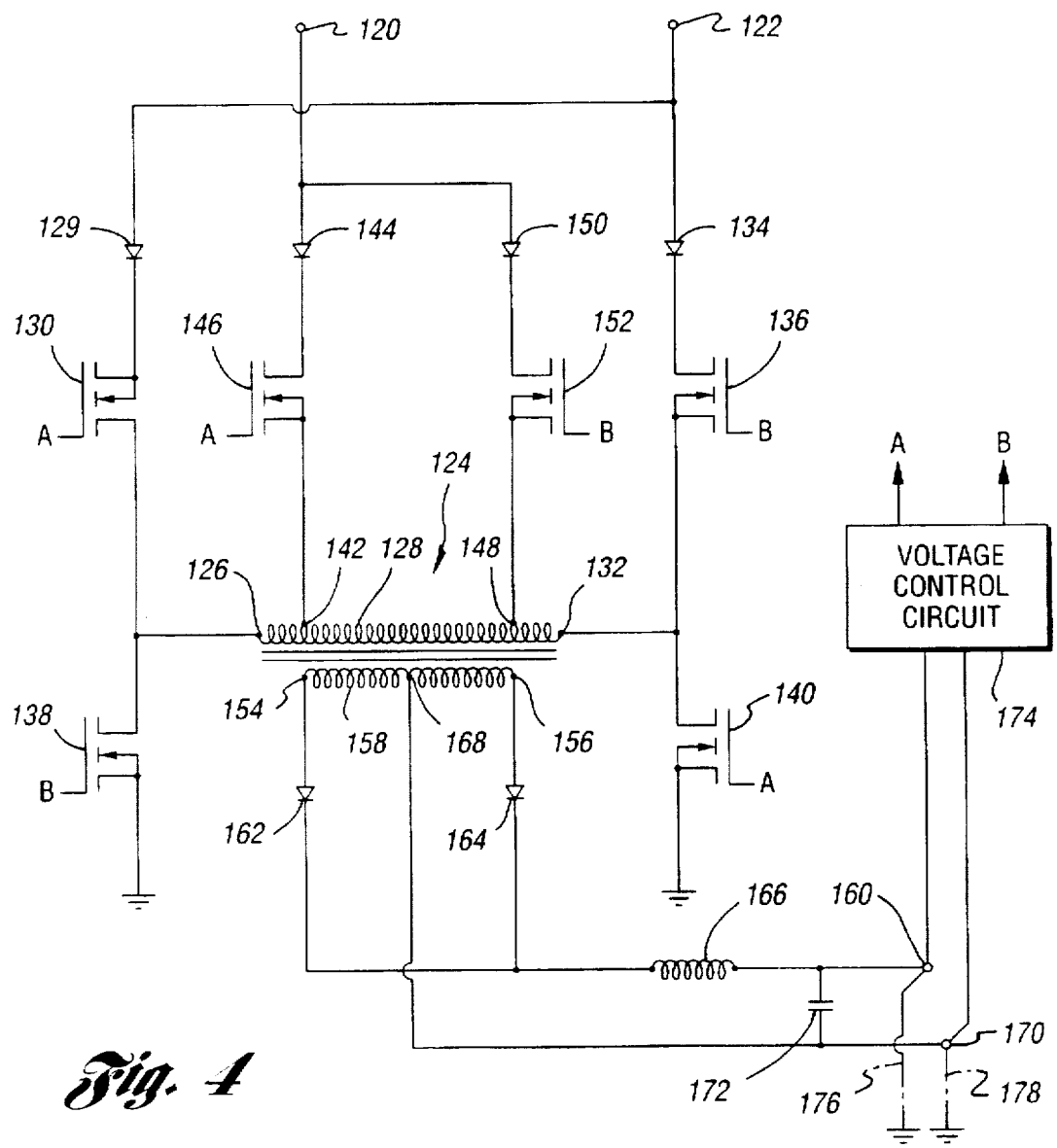
FIG. 4 is a circuit diagram of a third embodiment of a multiple source bus regulator capable of producing a positive or a negative bus voltage.

A third embodiment of the Multiple Source Bus Regulator 12 is illustrated in FIG. 4. The Multiple Source Bus Regulator has two input terminals 120 and 122 which are connected to a multiple tap isolation transformer 124. Input terminal 122 is connected to one end 126 of a primary winding 128 of the transformer 124 through an isolation diode 129 and a switch, indicated by field effect transistor 130 and to the opposite end 132 of the primary winding 128 through an isolation diode 134 and a switch indicated by field effect transistor 136. A switch illustrated by field effect transistor 138 is connected between the one end 126 of the primary winding 128 and ground and a switch illustrated by field effect transistor 140 is connected between the opposite end 132 of the primary winding 128 and ground.

The input terminal 120 is connected to a first tap 142 of the primary winding 128 through an isolation diode 144 and a switch implemented by field effect transistor 146 and is connected to tap 148 through an isolation diode 150 and a switch implemented by field effect transistor 152.

The opposite ends 154 and 156 of the secondary winding 158 are connected to a positive bus terminal 160 through isolation diodes 162 and 164, respectively, and through coil 166. The centertap 168 of the secondary winding 158 is connected to a negative bus terminal 170 and a filter capacitor 172 is connected between the positive bus terminal 160 and the negative bus terminal 170. By grounding either the positive bus terminal 160 or the negative bus terminal 170, as indicated in phantom by lines 176 and 178, respectively, the embodiment illustrated in FIG. 4 may provide either a positive or a negative bus voltage.

A voltage control circuit 174 connected to the positive bus terminal 160 and the negative bus terminal 170 generates wave trains A and B 180° out of phase with each other. Wave train A is applied to the gates of field effect transistors 130, 140 and 146, and wave train B is applied to the gates of field effect transistors 136, 138 and 152 as indicated. The frequency of the wave trains A and B are preferably in the range from 20 KHz to 200 KHz but the invention is not limited to this frequency range. Field effect transistors 130, 140 and 146 are activated by wave train A to produce a current flow through the primary winding 128 in a first direction and field effect transistors 136, 138 and 152 are activated by wave train B to produce a current flow in the opposite direction. The current in the secondary winding 158 induced by the oscillating current flow in the primary winding 128 is rectified by diodes 162 and 164 to produce a potential difference between the positive and negative bus terminals 160 and 170, respectively.

The voltage control circuit 174 is responsive to the voltage difference between the voltages at the positive and negative bus terminals 160 and 170 to control the duty cycles of the A and B wave train signals so as to maintain a preselected regulated voltage difference between the positive and negative bus terminals 160 and 170 independent of the load therebetween.

As with the embodiment shown in FIG. 3, the circuit shown in FIG. 4 may have three or more input terminals and the primary coil 128 may have more than two taps.

Further, the wave train signals A and B are not necessarily complementary and the combined duty cycles may be less than 100%.

Having disclosed the fully regulated power bus subsystem and preferred and alternate embodiments of the multiple source bus regulator, it is recognized that those skilled in the art may make certain changes and improvements thereto within the scope of the invention set forth in the appended claims.

What is claimed is:

1. A fully regulated multiple source power bus subsystem, comprising:
   a first unregulated source of electrical power having a voltage output;
   at least a second source of unregulated electrical power having a voltage output; and
   at least one multiple source bus regulator receiving unregulated electrical power from said first and said at least a second source of unregulated power to produce a regulated preselected bus voltage, said at least one multiple source bus regulator automatically switching between said first and said at least a second unregulated source of electrical power based on which voltage output of said first and at least second unregulated source is greater, wherein said at least one multiple source bus regulator comprises:
   a multiple tap buck transformer having an input end and an output end with a voltage;
   a first switch periodically connecting said first unregulated source of electrical power to said input end of said transformer in response to a first wave train signal;
   a second switch periodically connecting said at least one second source of electrical power to a first tap on said transformer in response to said first wave train signal;
   a third switch periodically connecting a second tap on said transformer to ground in response to a second wave train signal which is a complement of said first wave train signal; and
   a voltage control circuit for generating said first wave train signal and said second wave train signal, said voltage control circuit responsive to the voltage at said output end of said transformer to generate and control duty cycles of said first and second wave train signals so as to maintain the voltage at said output end of said transformer at a preselected bus voltage.

2. A fully regulated multiple source power bus subsystem, comprising:
   a first unregulated source of electrical power having a voltage output;
   at least a second source of unregulated electrical power having a voltage output; and
   at least one multiple source bus regulator receiving unregulated electrical power from said first and said at least a second source of unregulated power to produce a regulated preselected bus voltage, said at least one multiple source bus regulator automatically switching between said first and said at least a second unregulated source of electrical power based on which voltage output of said first and at least second unregulated source is greater, wherein said bus system is the bus system for a satellite and wherein said first unregulated source of electrical power is a solar panel array and said at least a second unregulated source of electrical power is a battery, wherein said at least one multiple source bus regulator comprises:
   a multiple tap buck transformer having an input lend and an output end with a voltage;
   a first switch periodically connecting said first unregulated source of electrical power to said in put end of said transformer in response to said first wave train signal;
   a second switch periodically connecting said at least one second source of electrical power to a first tap on said transformer in response to said first wave train signal;
   a third switch periodically connecting a second tap on said transformer to ground in response to a second wave train signal which is a complement of said first wave train signal; and
   a voltage control circuit for generating said first wave train signal and said second wave train signal, said voltage control circuit responsive to the voltage at said output end of said transformer to generate and control duty cycles of said first and second wave train signals so as to maintain the voltage at said output end of said transformer at a preselected bus voltage.

3. A fully regulated multiple source power bus subsystem, comprising:
   a first unregulated source of electrical power having a voltage output;
   at least a second source of unregulated electrical power having a voltage output; and
   at least one multiple source bus regulator receiving unregulated electrical power from said first and said at least a second source of unregulated power to produce a regulated preselected bus voltage, said at least one multiple source bus regulator automatically switching between said first and said at least a second unregulated source of electrical power based on which voltage output of said first and at least second unregulated source is greater, wherein said at least one multiple source bus regulator comprises:
   a multiple tap buck transformer having an electrically isolated segment between an input end and a first tap and a remaining segment including an output end with a voltage, said first unregulated source of electrical power being connected to said input end and said at least a second unregulated source of electrical power connected to said first tap;
   a first switch connecting said isolated segment to said remaining segment in response to a first wave train signal; and
   a second switch connecting a second tap of said transformer provided in said remaining segment to ground in response to a second wave train signal which is a complement of said first wave train signal;
   a control circuit generating said first wave train signal and said second wave train signal, said control circuit generating and controlling duty cycles of said first and second wave train signals in response to the voltage at said output end of said transformer to maintain the voltage at said output end of the transformer at a preselected bus voltage.

4. A fully regulated multiple source power bus subsystem, comprising:
   a first unregulated source of electrical power having a voltage output;
   at least a second source of unregulated electrical power having a voltage output; and
   at least one multiple source bus regulator receiving unregulated electrical power from said first and said at least a second source of unregulated power to produce a regulated preselected bus voltage, said at least one multiple source bus regulator automatically switching between said first and said at least a second unregulated source of electrical power based on which voltage output of said first and at least second unregulated source is greater, wherein said at least one multiple source bus regulator comprises:

a multiple tap buck transformer having an electrical isolated segment between an input end and a first tap and a remaining segment including an output end with a voltage, said first unregulated source of electrical power being connected to said input end and said at least a second unregulated source of electrical power connected to said first tap; further including at least a third unregulated source of electrical power connected to a third tap provided on said isolated segment of said transformer intermediate said input end and said first tap;

a first switch connecting said isolated segment to said remaining segment in response to a first wave train signal; and a second switch connecting a second tap of said transformer provided in said remaining segment to ground in response to a second wave train signal which is a complement of said first wave train signal;

a control circuit generating said first wave train signal and said second wave train signal, said control circuit generating and controlling duty cycles of said first and second wave train signals in response to the voltage at said output end of said transformer to maintain the voltage at said output end of the transformer at a preselected bus voltage.

5. A fully regulated multiple sourced power bus subsystem, comprising:

a first unregulated source of electrical power having a voltage output;

at least a second source of unregulated electrical power having a voltage output; and at least one multiple source bus regulator receiving unregulated electrical power from said first and said at least a second source of unregulated power to produce a regulated preselected bus voltage, said at least one multiple source bus regulator automatically switching between said first and said at least a second unregulated source of electrical power based on which voltage output of said first and at least second unregulated source is greater wherein said multiple source bus regulator comprises:

an isolation transformer having a primary winding and a secondary winding, said primary winding having a first tap provided adjacent one end and a second tap provided adjacent a second end and said secondary winding having a center tap provided intermediate the ends of said secondary winding;

first set of switches for periodically connecting said first and said at least a second source of electrical power to said one end and said first tap of said primary winding respectively, and for connecting said second end to ground in response to a first wave train signal causing a current flow in said primary winding in a first direction;

second set of switches for periodically connecting said first and said at least a second source of electrical power to said second end and said second tap of said primary winding respectively, and for connecting said first end of said primary winding to ground in response to a second wave train signal causing said current to flow in said primary winding in a direction opposite said first winding to induce a current in the secondary winding;

a rectifier responsive to the current induced in said secondary winding to generate a voltage difference with a positive voltage at a positive bus terminal and a negative voltage at a negative bus terminal; and a voltage control circuit for generating said first and second wave train signals, said second wave train signal being 180° out of phase with said first wave train signal, said first and second wave train signals having a duty cycle controlled by said voltage control circuit in response to the voltage difference between said positive and negative bus terminals to control the voltage difference between the voltages at said positive and negative bus terminals at a preselected bus voltage.

6. A fully regulated multiple source power bus subsystem, comprising:

a first unregulated source of electrical power having a voltage output;

at least a second source of unregulated electrical power having a voltage output; and at least one multiple source bus regulator receiving unregulated electrical power from said first and said at least a second source of unregulated power to produce a regulated preselected bus voltage, said at least one multiple source bus regulator automatically switching between said first and said at least a second unregulated source of electrical power based on which voltage output of said first and at least second unregulated source is greater wherein said multiple source bus regulator comprises:

an isolation transformer having a primary winding and a secondary winding, said primary winding having a first tap provided adjacent one end and a second tap provided adjacent a second end and said secondary winding having a center tap provided intermediate the ends of said secondary winding;

first set of switches for periodically connecting said first and said at least a second source of electrical power to said one end and said first tap of said primary winding respectively, and for connecting said second end to ground in response to a first wave train signal causing a current flow in said primary winding in a first direction;

second set of switches for periodically connecting said first and said at least a second source of electrical power to said second end and said second tap of said primary winding respectively, and for connecting said first end of said primary winding to ground in response to a second wave train signal causing said current to flow in said primary winding in a direction opposite said first winding to induce a current in the secondary winding;

a rectifier responsive to the current induced in said secondary winding to generate a voltage difference with a positive voltage at a positive bus terminal and a negative voltage at a negative bus terminal; and a voltage control circuit for generating said first and second wave train signals, said second wave train signal being 180° out of phase with said first wave train signal, said first and second wave train signals having a duty cycle controlled by said voltage control circuit in response to the voltage difference between said positive and negative bus terminals to control the voltage difference between the voltages at said positive and negative bus terminals at a preselected bus voltage wherein said preselected bus voltage is a preselected negative bus voltage.

7. A multiple source bus regulator for a fully regulated multiple source power bus subsystem comprising:

a multiple tap buck transformer having an input end and an output end with a voltage;

a first switch periodically connecting a first unregulated source of electrical power to said input end of said transformer in response to a first wave train signal;

a second switch periodically connecting at least one second source of electrical power to a first tap on said transformer in response to said first wave train signal;

a third switch periodically connecting a second tap on said transformer to ground in response to a second wave train signal which is a complement of said first wave train signal; and a voltage control circuit for generating said first wave train signal and said second wave train signal, said voltage control circuit responsive to the voltage at said output end of said transformer to generate and control duty cycles of said first and second wave train signals so as to maintain the voltage at said output end of said transformer at a preselected bus voltage.

8. A multiple source bus regulator for a fully regulated multiple source power bus subsystem comprising:

a multiple tap buck transformer having an electrically isolated segment between an input end connected to a first unregulated source of electrical power and a first tap connected to a second unregulated source of electrical power and a remaining segment including an output end with a voltage;

a first switch connecting said isolated segment to said remaining segment in response to a first wave train signal; and a second switch connecting a second tap of said transformer provided in said remaining segment to ground in response to a second wave train signal which is a complement of said first wave train signal;

a control circuit generating said first wave train signal and said second wave train signal, said control circuit generating and controlling duty cycles of said first and second wave train signals in response to the voltage at said output end of said transformer to maintain the voltage at said output end of the transformer a preselected bus voltage.

9. A multiple source bus regulator for a fully regulated multiple source power bus subsystem comprising:

an isolation transformer having a primary winding and a secondary winding, said primary winding having a first tap provided adjacent one end and a second tap provided adjacent a second end and said secondary winding having a center tap provided intermediate the ends of said secondary winding;

first set of switches for periodically connecting at least a first and a second source of electrical power to said one end and said first tap of said primary winding respectively, and for connecting said second end of said primary winding to ground in response to a first wave train signal causing a current flow in said primary winding in a first direction;

second set of switches for periodically connecting at least said first and said second source of electrical power to said second end and said second tap of said primary winding respectively, and for connecting said first end of said primary winding to ground in response to a second wave train signal causing said current to flow in said primary winding in a direction opposite said first winding to induce a current in the secondary winding;

a rectifier responsive to the current induced in said secondary winding to generate a voltage difference with a positive voltage at a positive bus terminal and a negative voltage at a negative bus terminal; and a voltage control circuit for generating said first and second wave train signals, said second wave train signal being 180° out of phase with said first wave train signal, said first and second wave train signals having a duty cycle controlled by said voltage control circuit in response to the difference in the voltage between said positive and negative bus terminals control the voltage difference between the voltages at said positive and negative bus terminals at a preselected bus voltage.

10. The multiple source bus regulator of claim 9 wherein said preselected bus voltage is a preselected negative bus voltage.

* * * * *